United States Patent [19]

Remsburg

[11] Patent Number: 5,401,066
[45] Date of Patent: * Mar. 28, 1995

[54] FLUID FLOW CONNECTOR
[75] Inventor: Ralph Remsburg, Irvine, Calif.
[73] Assignee: Preece Incorporated, Irvine, Calif.
[*] Notice: The portion of the term of this patent subsequent to Apr. 28, 2009 has been disclaimed.
[21] Appl. No.: 412,060
[22] Filed: Sep. 25, 1989
[51] Int. Cl.⁶ .............................................. F16L 21/00
[52] U.S. Cl. ........................................ 292/38; 292/86; 292/91
[58] Field of Search ..................... 285/39, 38, 86, 85, 285/84, 315, 316, 355, 390, 91; 411/1-7; 137/614.03

[56] References Cited
U.S. PATENT DOCUMENTS

| | | | |
|---|---|---|---|
| 1,069,146 | 8/1913 | Kennedy | 285/86 |
| 1,477,440 | 12/1923 | Grier . | |
| 1,580,694 | 4/1926 | Smith | 285/86 |
| 1,866,863 | 7/1932 | Richardson . | |
| 2,729,134 | 1/1956 | Stanton, Jr. et al. | 411/6 |
| 2,828,978 | 4/1958 | Wurzburger | 285/85 |
| 2,898,963 | 8/1959 | Courtot | 285/85 |
| 2,934,359 | 4/1960 | Smisko et al. | 285/86 |
| 3,100,655 | 8/1963 | Work . | |
| 3,273,443 | 9/1966 | Rubin | 411/7 |
| 3,345,086 | 10/1967 | Wallace | 285/38 |
| 3,425,314 | 2/1969 | Ohlson | 411/7 |
| 3,519,975 | 7/1970 | Prow et al. . | |
| 3,524,160 | 8/1970 | Robinson . | |
| 3,656,781 | 4/1972 | Paine et al. . | |
| 3,727,952 | 4/1973 | Richardson . | |
| 3,888,559 | 6/1975 | Geib . | |
| 4,005,735 | 2/1977 | Miyamoto . | |
| 4,543,993 | 10/1985 | Calvin et al. | 285/316 |
| 4,815,495 | 3/1989 | Remsburg | 137/614.03 |

FOREIGN PATENT DOCUMENTS

| | | | |
|---|---|---|---|
| 577404 | 6/1959 | Canada | 285/86 |
| 783265 | 9/1957 | United Kingdom | 285/86 |
| 957876 | 5/1964 | United Kingdom | 285/85 |

Primary Examiner—Eric K. Nicholson
Attorney, Agent, or Firm—Leonard Tachner

[57] ABSTRACT

A fluid flow connector with a structure for preventing over-torquing of the coupler and the nipple during engagement and furthermore, preventing inadvertent disengagement of the coupler from the nipple which might otherwise occur upon oppositely directed rotation of an outer shell of the coupler. The nipple is provided with a shoulder which, upon full engagement between the coupler and the nipple to a desired level of torque between the threads thereof, abuts the end of the outer shell. Subsequent further rotation of the shell causes relative travel between the outer shell and the coupler threads until the dowel disengages the first set of teeth whereby any further rotation of the outer shell will not impart a rotational force or torque to the coupler threads. In order to accomplish such disengagement it is necessary to translate the outer shell away from the nipple shoulder against the force of a shell biasing spring until the dowel thereof engages a second set of teeth displaced axially from the first set of teeth. Only upon such translation of the outer shell in an axial direction relative to the coupler threads and subsequent engagement of the dowel with the second set of teeth, is it possible to cause the coupler threads to rotate away from the nipple threads upon rotation of the outer shell.

5 Claims, 7 Drawing Sheets

FLUID FLOW CONNECTOR

BACKGROUND OF THE INVENTION

1. Field of the Invention

The present invention relates generally to fluid flow connector devices of the type used for interconnecting two flexible pipes carrying a fluid and more specifically, to an improved threaded fluid flow connector wherein the nipple and coupler thereof are interconnected by a threaded engagement.

2. Prior Art

Fluid flow connector which comprise mating coupler and nipple portions, are commonly used on interconnectable, flexible pipes or hoses for transferring a fluid therebetween. Fluid flow connector generally enable expedient connection and separation of such hoses or pipes wherein the flow path is automatically interrupted upon separation to prevent the leakage of any substantial amount of fluid and is automatically unblocked or uninterrupted upon interconnection of the coupler and nipple to enable free flow of fluids therebetween upon connection. Once the coupler and nipple of a fluid flow connector have been interconnected, there are a variety of ways to secure them to one another so that they cannot inadvertently become separated and interrupt the flow of fluid therebetween when unattended. One of the most secure ways of interconnecting the nipple and coupler of a fluid flow connector is by threaded engagement therebetween.

The present invention comprises a threaded fluid flow connector in which the novel features may be identified as a means for limiting the locking torque between the coupler and nipple and a positive pull-slide action requirement for beginning the unthreading or decoupling of the nipple and coupler in order to prevent inadvertent decoupling. The most relevant prior art in regard to these features of the threaded fluid flow connector of the present invention and which are known to the applicant include the following:

U.S. Pat. No. 1,477,440 Grief, Jr.
U.S. Pat. No. 1,866,863 Richardson
U.S. Pat. No. 3,100,655 Work
U.S. Pat. No. 3,519,975 Prow, Jr. et al
U.S. Pat. No. 3,524,160 Robinson
U.S. Pat. No. 3,656,781 Paine et al
U.S. Pat. No. 3,727,952 Richardson
U.S. Pat. No. 3,888,559 Geib
U.S. Pat. No. 4,005,735 Miyamoto U.S. Pat. No. 4,005,735 to Miyamoto shows an adaptor with a thread protector and the end of the adaptor is threadedly engaged on the hose ferrule. A sleeve is biased forwardly by a spring so that a member extends over and protectively encloses the male threads. When the device is to be connected to something like a nozzle, the sleeve is moved axially away from the threads which exposes them and the nozzle is attached.

U.S. Pat. No. 3,888,559 to Geib is directed to a high voltage fluid flow connector assembly. A locking cylinder includes a sleeve portion which surrounds a portion of a shell near the base portion. The sleeve portion ends at an end surface which abuts the shoulder portion formed around the periphery of the base portion. Thus, the locking cylinder may only be moved toward the base portion until the end surface of the sleeve portion engages the shoulder of the base. A coil spring is positioned between the outer surface of the cylindrical shell and the sleeve portion of the locking cylinder. An end of the coil spring abuts the shoulder coupled to the cylindrical shell while the other end of the coil spring abuts a shoulder which forms a portion of the cylinder. In this manner, the spring biases the locking cylinder away from the base portion.

U.S. Pat. No. 3,727,952 to Richardson is directed to a tube connector system where a sleeve may be retracted and which opens collets which allows for the placement of the connector over a fitting of the equipment.

U.S. Pat. No. 1,866,863 to Richardson is directed to a drill steel retainer and although it works on a somewhat different principle, to remove a sleeve to place the drill, a collar is pressed in a backward direction against the pressure of a spring to disengage lugs of the collar from recesses of the sleeve. The sleeve is then rotated to move the lugs from the grooves and the sleeve is slid off the head.

Based upon the above, it is readily apparent that there are no known prior art U.S. patents which disclose a threaded fluid flow connector in which there are means for limiting the threading torque to avoid inadvertent over-threading and subsequent damage to the interconnecting parts of the fluid flow connector, nor is there any prior art U.S. patents which disclose a means for requiring a positive, manual, springbiased, pull-slide action for unthreading the coupler and nipple of a threaded fluid flow connector in order to avoid inadvertent decoupling.

SUMMARY OF THE INVENTION

The present invention comprises a threaded fluid flow connector having novel features in the form of a ratchet-type means for limiting the locking torque between the coupler and nipple and a positive, spring-biased, pull-slide action required for beginning the unthreading of the coupler from the nipple in order to prevent inadvertent decoupling. The coupler of the present invention comprises an outer shell from which a dowel extends inwardly in a radial direction towards the remaining structure of the coupler to which the outer shell is attached by means of a spring biasing arrangement. When the outer shell is in its unbiased position, wherein the biasing spring is uncompressed, the dowel extends toward and engages a first set of teeth affixed to the coupler so that rotation of the outer shell results in rotation of the coupler thread. As a result, when it is desired to engage the coupler thread with the nipple thread, rotation of the outer shell of the coupler will cause the two threads to engage, thereby causing gradual travel of the coupler toward a shoulder on the nipple which lies just beyond the nipple thread. Eventually, the outer shell reaches the nipple shoulder and cannot travel any further. At this point, further rotation of the outer shell axially displaces the outer shell dowel from the first set of teeth in the coupler, ultimately resulting in disengagement of the dowel of the outer shell and the first set of teeth. Subsequent to this disengagement, further rotation of the outer shell has no effect upon the remaining portion of the coupler body and no further threading can take place because the outer shell can no longer apply torque to the coupler thread. Consequently, one novel feature of the present invention is a ratchet-like clutch action for limiting the locking torque between the coupler and the nipple which prevents any inadvertent overthreading and resulting damage to the fluid flow connector.

A second novel feature of the present also relates to the interaction between the outer shell dowel and the coupler thread. More specifically, in order to disconnect or unthread the coupler from the nipple, it is necessary to purposely displace the outer shell axially away from the nipple shoulder against a spring force until the dowel engages a second set of teeth on the coupler body. After the outer shell dowel engages the second set of teeth, it is possible to begin unthreading the coupler from the nipple. After a few unthreading turns of the outer shell which withdraws the thread of the coupler from the thread of the nipple, the outer shell may then be released. The spring which biases the outer shell, then forces the outer shell back into its nominal condition wherein the dowel may now engage the first set of teeth so that the unthreading or decoupling of the coupler from the nipple may proceed with the outer shell in its unbiased condition. Accordingly, this second novel feature of the present invention requires that for disengaging the coupler from the nipple one must slide the outer shell away from the nipple shoulder against a spring bias until the dowel engages the second set of teeth and after a few turns of the outer shell in this configuration, the outer shell can be permitted to spring back to its nominal position where the dowel again engages the first set of teeth for completing the dethreading of the coupler from the nipple. In this manner the second novel feature of the present invention precludes any possibility of inadvertently decoupling the coupler from the nipple which might otherwise occur if it were possible to dethread simply by turning the outer shell without first sliding it in an axial direction away from the nipple shoulder.

OBJECTS OF THE INVENTION

It is therefore a principal object of the present invention to provide a novel threaded fluid flow connector having means for limiting the maximum torque which may be applied between the coupler thread and the nipple thread for interconnecting those two elements of the fluid flow connector.

It is an additional object of the present invention to provide a threaded fluid flow connector having means for preventing any inadvertent over-torquing of the coupler and nipple threads.

It is still an additional object of the present invention to provide a threaded fluid flow connector having a ratchet-style clutching means in the coupler portion thereof for limiting the travel between the coupler thread and the nipple thread during interconnection.

It is still a further object of the present invention to provide a threaded fluid flow connector in which for purposes of dethreading or disengaging the coupler thereof from the nipple thereof, it is necessary for the user to impart a forceful axial motion to an outer shell of the coupler before the outer shell can be engaged for the purposes of dethreading the coupler from the nipple.

It is still an additional object of the present invention to provide an improved threaded fluid flow connector in which inadvertent over-torquing of the threads of the coupler and nipple thereof and inadvertent disengagement of the coupler from the nipple are rendered substantially impossible.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
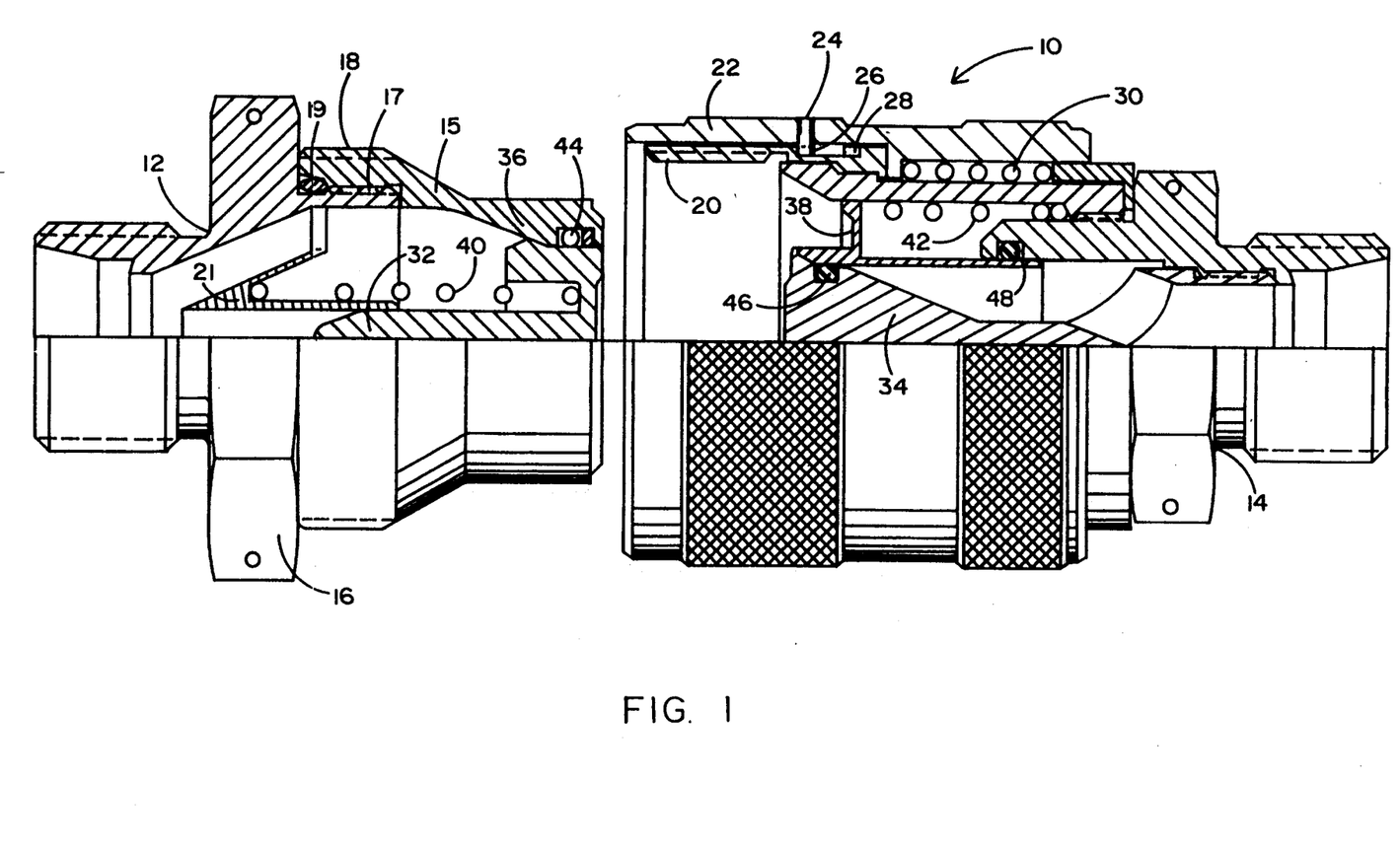
FIG. 1 is a partially cross-sectioned plan view of the threaded fluid flow connector of the present invention showing the coupler and nipple portions thereof in their disengaged positions.

Referring now first to FIG. 1, it will be seen that the threaded fluid flow connector 10 of the present invention comprises a nipple 12 and a coupler 14. Nipple 12 is characterized by a nipple body 15 and a nipple shoulder 16. The nipple body 15 comprises inner threads 17 which are adapted to mate with corresponding threads adjacent the nipple shoulder 16 and outer threads 18 which are adapted to mate with corresponding threads in the coupler 14 to be disclosed hereinafter. More specifically, coupler 14 comprises threads 20 and an outer shell 22 having a dowel or pin 24 adapted to mate with either a first set of teeth 26 or a second set of teeth 28 as will be disclosed hereinafter in more detail.

As will be seen hereinafter, the outer shell 22 of coupler 14 is movable in an axial direction relative to coupler threads 20. Movement of outer shell 22 relative to threads 20 of coupler 14 from the nominal position shown in FIG. 1, requires compression of a biasing spring 30. It will seen hereinafter that such movement occurs automatically to a nominal extent when the coupler 14 is fully mated with the nipple 12. It is in fact, this relative movement of the outer shell 22 relative to the threads 20 which causes the dowel 24 to be displaced from the first set of teeth 26 thereby preventing over-torquing of the threads of the coupler and nipple. Relative movement of the outer shell 22 to the threads 20 is also required when it is desired to disengage the fully engaged coupler and nipple. As will be seen hereinafter, in order to accomplish such disengagement, it is necessary to move or translate the outer shell 22 more substantially in order to engage dowel 24 with the second set of teeth 28 of coupler 14.

The remaining components of the coupler and nipple are relatively standard elements of a fluid flow connector for permitting fluid flow through the coupler and nipple when they are completely engaged and for preventing fluid flow through both the coupler and nipple when they are completely disengaged. More specifically, for this purpose nipple 12 is provided with a poppet 32, an annulus 36, and a popper spring 40 while coupler 14 is provided with a stem 34, a poppet 38 and a poppet spring 42. The specific manner in which these latter elements of more conventional configuration interact during engagement and disengagement of the coupler and nipple, is rather conventional and well-known in the art and need not be described in any further detail herein. The same may be said of O-ring 19, guide 21, and O-rings 44, 46 and 48. Suffice it to say, that when the coupler and nipple are in their completely disengaged position as seen in FIG. 1, poppet 32 blocks fluid flow through the nipple 12 while popper 38 prevents fluid flow through the coupler 14. On the other hand, when the nipple and coupler are in their completely engaged position shown in FIG. 4, popper 32 and stem 34 are in a position which results in the compression of poppet spring 40 thereby permitting fluid flow through the nipple 12 while simultaneously annulus 36 and popper 38 are in compressive engagement resulting in compression of popper spring 42 thereby permitting fluid to flow through coupler 14.

Figure 2:
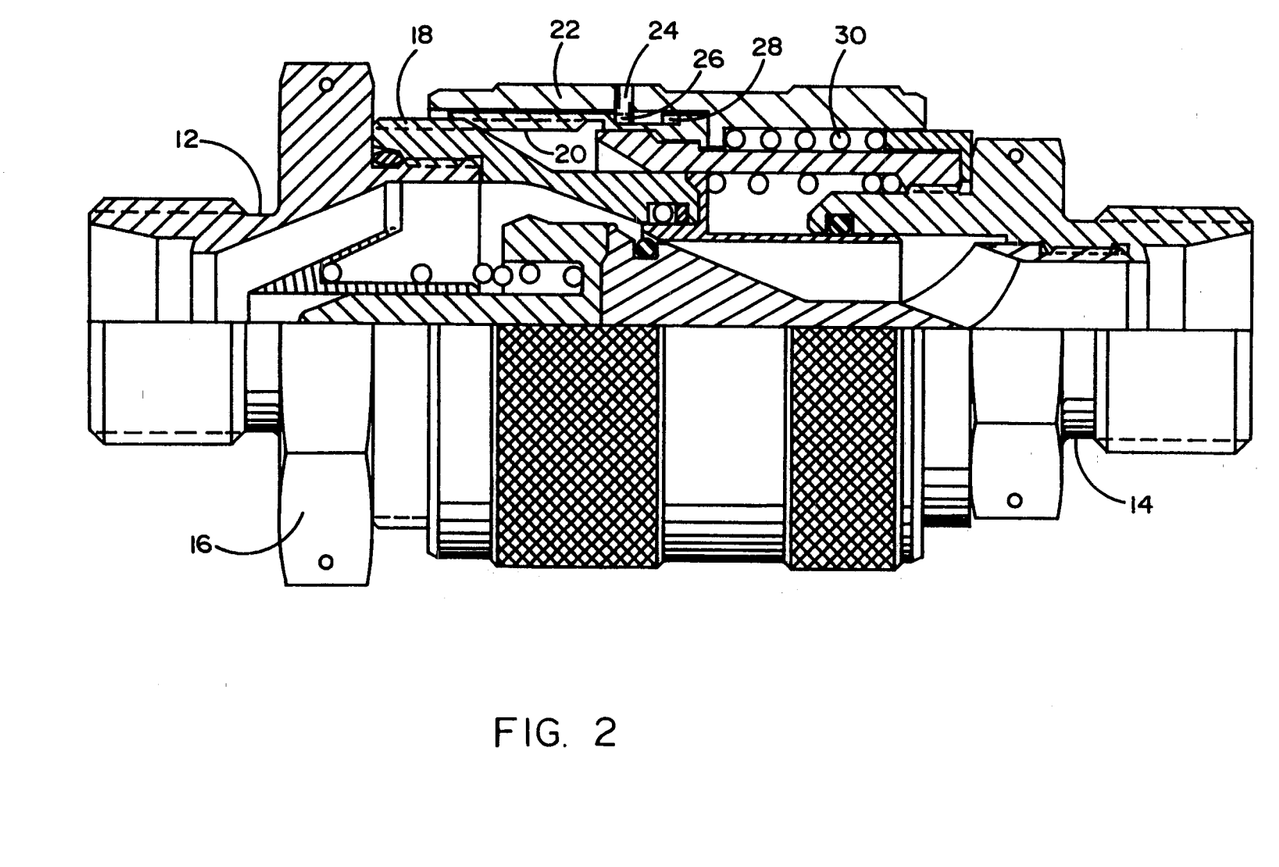
FIG. 2 is a view similar to that of FIG. 1 but, illustrating the relative positions of the coupler and the nipple of the present invention at the commencement of threaded interconnection therebetween.
Figure 3:
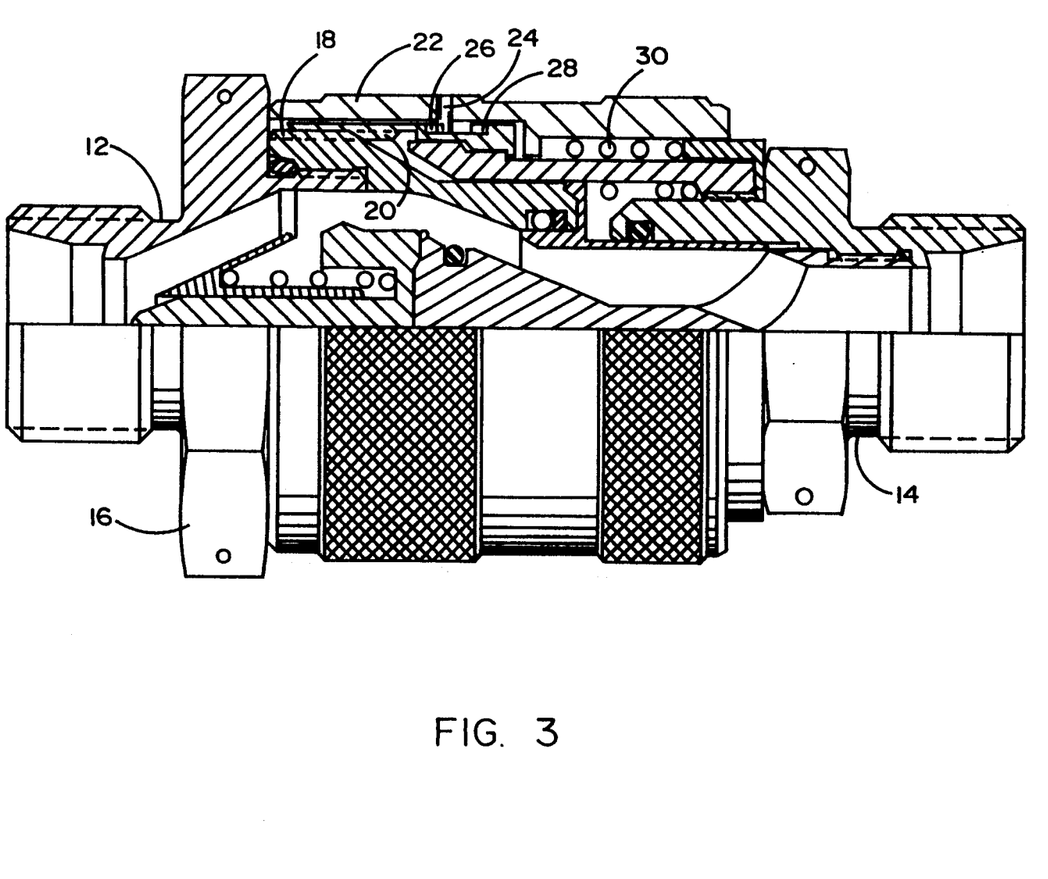
FIG. 3 is a view similar to that of FIGS. 1 and 2, but illustrating the relative interconnection positions of the coupler and the nipple of the present invention after further engagement of the threaded portions thereof.
Figure 4:
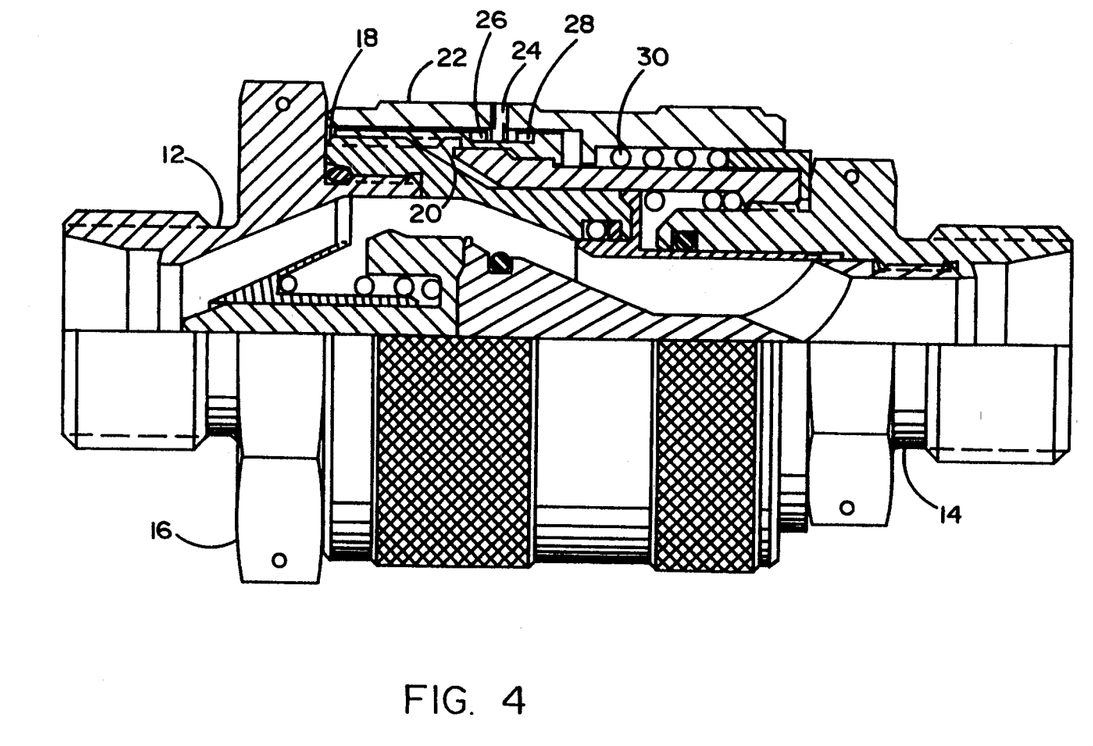
FIG. 4 is a view of the nipple and coupler of the present invention similar to that of FIGS. 1-3, but illustrating the fully threaded interconnection between the coupler and nipple portions of the present invention.

Turning now to FIG. 2 it will be seen that when the coupler and nipple are brought into initial engagement in an axial displacement of their relative positions shown in FIG. 1, the outer threads 18 of nipple 12 have engaged the coupler threads 20 of coupler 14. The continued rotation of outer shell 22 will, as a result of the interaction between dowel 24 and the first set of teeth 26, cause continued threading engagement between those sets of threads until the outer shell 22 hits the nipple shoulder 16 as shown in FIG. 3. Further rotation of the outer shell 22 does not permit the outer shell to travel any further towards the nipple 12 because it has already engaged the nipple shoulder 16 and is thus constrained in its axial movement towards the nipple. However, such further rotation causes relative movement between the outer shell 22 and the coupler threads 20 as the dowel 24, engaging the first set of teeth 26, causes the remaining portions of the coupler 14 to continue to travel toward the nipple 12 and specifically toward the nipple shoulder 16. This continued relative motion between the outer shell 22 and the coupler threads 20 causes a displacement between the dowel 24 and the first set of teeth 26. Initially this displacement is insufficient to disengage the dowel from the first set of teeth and such engagement, while not as complete as shown in FIG. 2, is still sufficient as shown in FIG. 3, to continue the relative movement of the outer shell and the coupler threads. However, ultimately, this relative movement will cause the complete disengagement of the dowel 24 and the first set of teeth 26, which corresponds to the condition shown in FIG. 4. At this point, any further rotation of the outer shell 22 will not cause any corresponding rotation of the coupler threads 20 and thus will not create any further motion of the coupler threads toward the nipple shoulder 16. Consequently, the configuration shown in FIG. 4 is the most threaded engagement that can be realized unless one purposely translates the outer shell to compress the shell biasing spring 30 to permit dowel 24 to engage the second set of teeth 28. Barring this intentional attempt to increase the engagement between coupler threads 20 and nipple threads 18, the maximum engaging torque between those respective sets of threads is reached upon the disengagement of dowel 24 with the first set of teeth 26 in the configuration shown in FIG. 4. Thus the present invention provides a means for limiting the degree of engagement between the threads of the coupler and nipple thereby preventing inadvertent over-torquing of such threaded engagement.

An additional novel and highly advantageous feature of the present invention is also derived from the relative motion of the outer shell 22 and the coupler threads 20 and the resultant engagement and disengagement of the dowel 24 with the first set of teeth 26. More specifically, because the dowel 24 is no longer engaging the first set of teeth 26 in the fully coupled configuration of FIG. 4, when one wishes to commence a disengaging action between the coupler and the nipple, more is required than merely rotating the outer shell 22 in the opposite direction. Clearly, because dowel 24 has been disengaged from the first set of teeth 26 upon reaching maximum torque between the coupler and nipple threads, mere rotation of the outer shell 22 in the opposite direction will produce no disengaging action between those threads. Consequently, inadvertent rotation of the outer shell 22 will not disengage the coupler from the nipple. In fact, in order to disengage the coupler 14 from the nipple 12, it is necessary to translate the outer shell 22 in an axial direction away from the nipple shoulder 16 until the dowel 24 engages the second set of teeth 28. However, such translation of the outer shell 22 requires compression of the shell biasing spring 30. Consequently, a deliberately applied axially-directed force on outer shell 22 must be employed in order to configure the outer shell relative to the second set of teeth 28 to commence disengagement of the coupler from the nipple.

Figure 5:
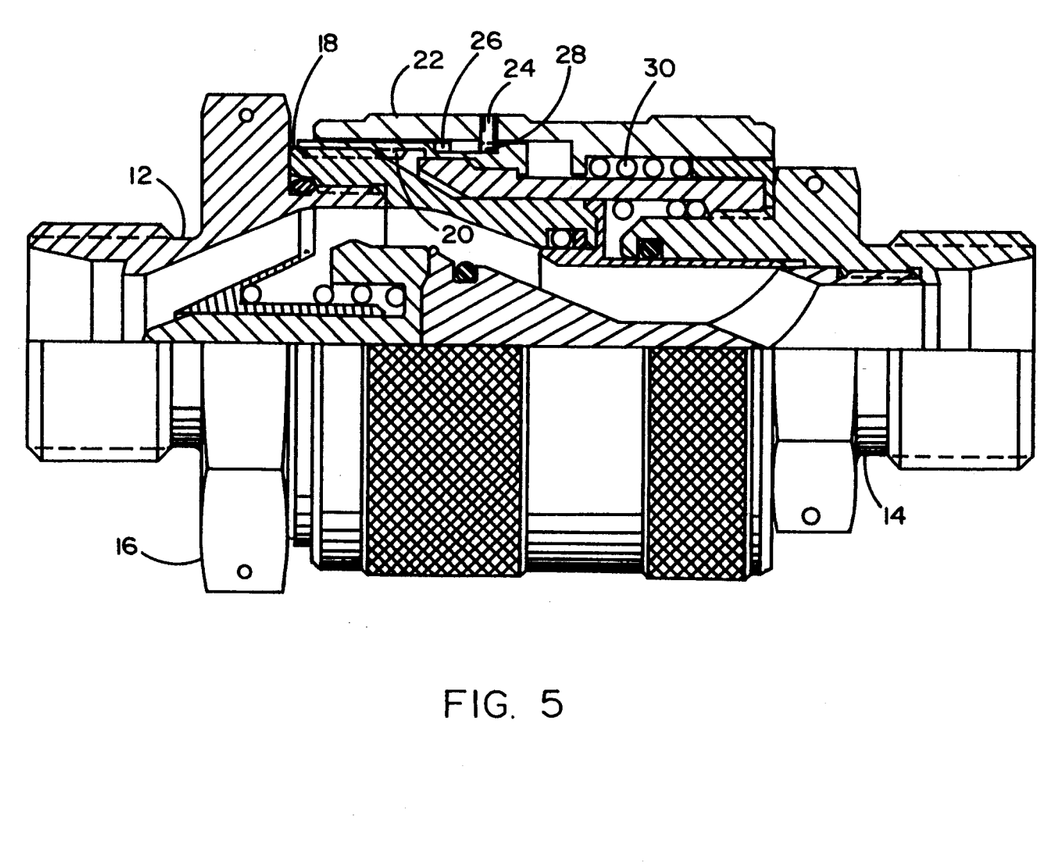
FIG. 5 is a view of the present invention similar to that of FIGS. 1-4, but illustrating the axially displaced position of the outer shell of the coupler which is required in order to begin dethreading or disengagement of the coupler from the nipple.
Figure 6:
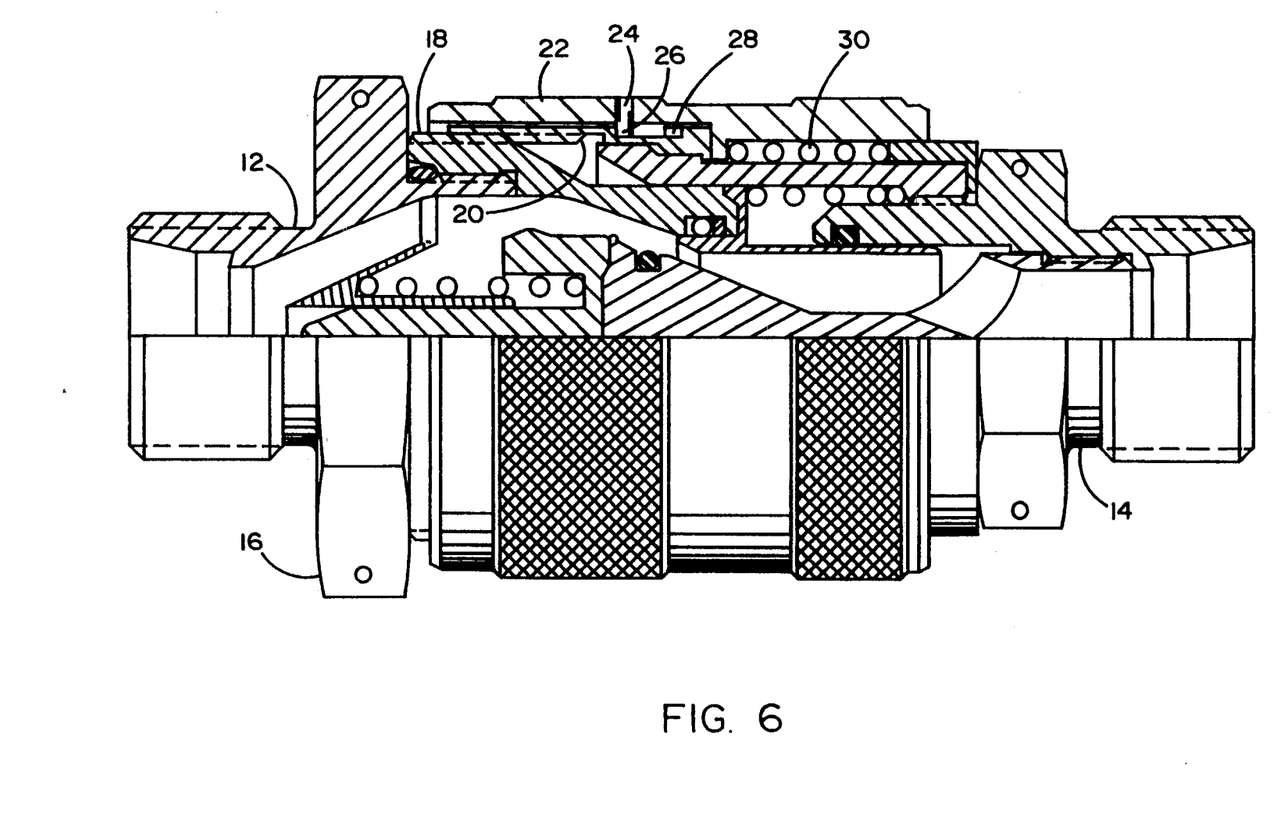
FIG. 6 is a view of the present invention similar to that shown in FIGS. 1-5, but illustrating the relative positions of the coupler and nipple of the present invention during the unthreading or decoupling operation after the outer shell has been released from its axially displaced position and after the coupler thread has been turned sufficiently to permit continued unthreading without further axial displacement of the outer shell.

FIGS. 5 and 6 illustrate the steps required for disengaging the coupler from the nipple. More specifically, as seen in FIG. 5, the outer shell 22 has been displaced axially in a direction away from the nipple shoulder 16 until the dowel 24 has engaged the second set of teeth 28. In this configuration rotation of the outer shell in the appropriate direction will cause the relative rotation of the coupler threads 22 and nipple threads 18 so that the coupler and nipple will begin to disengage. After a few turns of the outer shell 22 in this threaded configuration, the coupler threads 20 and the nipple threads 18 will have moved apart relative to one another sufficiently so that the outer shell 22 may be released from the compression force of biasing spring 30, allowing the biasing spring to become fully uncompressed wherein the dowel 24 will again engage the first set of teeth 26. Subsequent continued rotation of the outer shell 22 in the decoupling direction will then cause further decoupling of the coupler and the nipple because of the engagement of dowel 24 and the first set of teeth 26. Thus, the novel structure of the present invention provides a second advantageous feature which is the prevention of inadvertent decoupling of the coupler from the nipple by requiring a deliberate translation of the outer shell against a spring bias force in order to engage the dowel with a second set of teeth and thus enabling a decoupling torque to the coupler threads 20 relative to the nipple threads 18.

Figure 7:
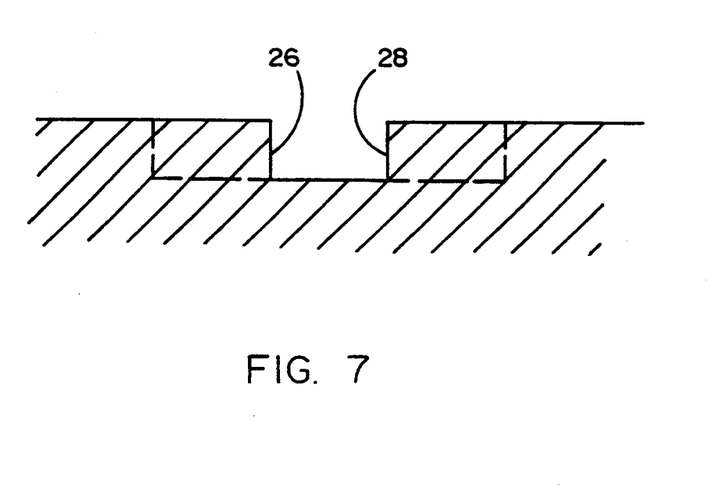
FIGS. 7 and 8 are side and top views, respectively, of the first and second sets of teeth of the present invention.
Figure 8:
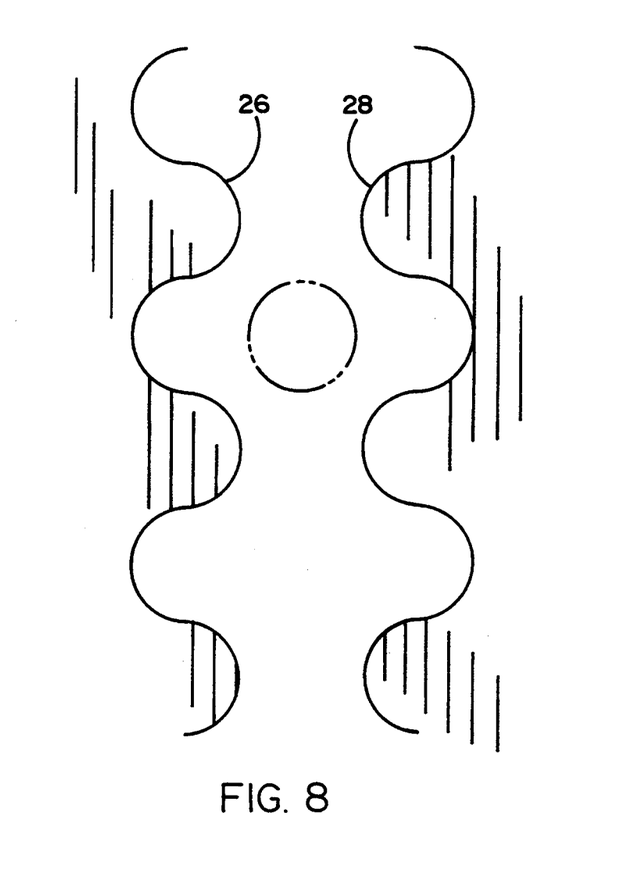

FIGS. 7 and 8 illustrate the two sets of teeth 26 and 28 in side and top views, respectively. As seen in FIGS. 7 and 8, the two sets of teeth 26 and 28 are of a sinusoidal configuration, but with rounded extremities designed to receive the circular dowel 24. In a preferred embodiment, teeth 26 are 0.1 inches deep; teeth 28 are 0.15 inches deep; dowel 24 is 0.094 inches in diameter; and the spacing between the two sets of teth is 0.15 inches.

It will now be understood that what has been disclosed herein comprises a novel and improved threaded fluid flow connector with a unique structure for preventing over-torquing of the coupler and the nipple during engagement and furthermore, preventing inadvertent disengagement of the coupler from the nipple which might otherwise occur upon oppositely directed rotation of an outer shell of the coupler. These features are achieved in the structure of the present invention by a unique coupler configuration which employs a rotatable outer shell which is movable relative to the coupler threads adapted for engagement with the nipple threads. The relative movement of the outer shell and the coupler threads must be accomplished by compression of a spring which ordinarily locates the outer shell in an axial position relative to the coupler threads so that a radially inwardly extending dowel or pin of the outer shell engages a first set of teeth. Rotation of the outer shell then causes rotation of the coupler threads. The nipple is provided with a shoulder which, upon full engagement between the coupler and the nipple to a desired level of torque between the threads thereof, abuts the end of the outer shell. Subsequent further rotation of the shell causes relative travel between the outer shell and the coupler threads until the dowel disengages the first set of teeth whereby any further rotation of the outer shell will not impart a rotational force or torque to the coupler threads. Consequently, the present invention provides a means for preventing inadvertent over-torquing of the coupler and nipple threads during engagement thereof. The relative movement of the outer shell and the coupler threads for limiting the torquing between the threads of the coupler and the nipple also provides a second highly advantageous feature, namely, preventing inadvertent disengagement of the coupler and the nipple by mere rotation of the outer shell in the opposite direction. More specifically, in order to accomplish such disengagement it is necessary to translate the outer shell away from the nipple shoulder against the force of a shell biasing spring until the dowel thereof engages a second set of teeth displaced axially from the first set of teeth. Only upon such translation of the outer shell in an axial direction relative to the coupler threads and subsequent engagement of the dowel with the second set of teeth, is it possible to cause the coupler threads to rotate away from the nipple threads upon rotation of the outer shell.

Those having skill in the art to which the present invention pertain will, as a result of the applicant's teaching herein, now perceive various modifications and additions which may be made to the invention. By way of example, the precise shape, dimensions and relative location of the outer shell, threads, dowel, and first and second sets of teeth of the coupler of the present invention may be readily altered. Furthermore, the dowel and teeth arrangement shown in the preferred embodiment of the invention disclosed herein may be readily replaced with other means for selectively engaging and disengaging the outer shell and the remaining structure of the coupler. One such example might be a ball and socket arrangement. Accordingly, it will be understood that all such modifications and additions which may be made to the invention are deemed to be within the scope of the invention which is to be limited only by the claims appended hereto.

I claim:

1. A threaded fluid flow connector comprising:
a coupler and a nipple, each having mating threads for engaging and disengaging said coupler to and from said nipple, respectively;
said coupler having an outer rotatable shell axially moveable relative to said coupler threads and having a dowel extending radially inward and said coupler also having a first set of teeth and a second set of teeth displaced axially from one another for receiving said dowel in one or the other set of teeth depending upon the relative axial position of said outer shell, rotation of said outer shell causing rotation of said coupler threads when said dowel is received by one of said sets of teeth and not causing rotation of said coupler threads when said dowel is displaced from both of said sets of teeth;
said nipple having a radially extending shoulder aligned with an axial end of said outer shell of said coupler, said outer shell being positioned for abutting said nipple shoulder at a selected degree of threaded engagement between said coupler threads and said nipple threads whereby further attempted threading of said coupler and said nipple causes a displacement of said outer shell from said coupler threads displacing said dowel from said first and second sets of teeth for preventing further such threading despite further rotation of said outer shell.

2. The fluid flow connector recited in claim 1 wherein said coupler further comprises a spring positioned for retaining said outer shell at a location for aligning said dowel and said first set of teeth, whereby displacement of said outer shell for moving said dowel toward said second set of teeth results in compression of said spring.

3. The fluid flow connector recited in claim 2 wherein said outer shell is positioned relative to said coupler threads so that dethreading of said coupler and said nipple requires initial axial translation of said outer shell until said dowel is received by the set of teeth furthest from said nipple shoulder.

4. The fluid flow connector recited in claim 3 wherein said outer shell is positioned relative to said coupler threads so that upon dethreading of said coupler and said nipple, after a preselected amount of dethreading said outer shell may be reversely axially translated until said dowel is received by said set of teeth closest to said nipple shoulder.

5. The fluid flow connector recited in claim 4 wherein said initial axial translation of said outer shell causes compression of said spring and said reverse axial translation of said outer shell permits relaxation of said spring.

* * * * *